United States Patent [11] 3,612,702

[72] Inventor John H. Troll
 Ridgefield, Conn.
[21] Appl. No. 856,390
[22] Filed Sept. 9, 1969
[45] Patented Oct. 12, 1971
[73] Assignee Iris Corporation

[54] WEB DEFECT DETERMINATION BY LASER BEAM IRRADIATION AND REFLECTED LIGHT EXAMINATION
 1 Claim, 4 Drawing Figs.
[52] U.S. Cl. .................................................. 356/200,
 250/219 WE, 250/219 DF, 356/238
[51] Int. Cl. ........................................................ G01n 21/32
[50] Field of Search ............................................ 356/199,
 200, 203, 212, 238; 250/219

[56] References Cited
UNITED STATES PATENTS
3,091,697  5/1963  Armbrecht .................. 356/203
3,188,478  6/1965  Binks ........................... 250/219 DF
3,330,961  7/1967  Juengst et al. ................ 356/200
3,360,651  12/1967  Linderman ................... 356/200
3,515,488  6/1970  Houser ......................... 356/200

Primary Examiner—Ronald L. Wibert
Assistant Examiner—Orville B. Chew, II
Attorney—Sandoe, Hopgood and Calimafde ABSTRACT: A laser beam is caused to scan a moving web transversely of the web direction of motion at a predetermined rate, and the detected light accumulated from one linear scan. The accumulated light is analyzed by a photomultiplier feeding a comparator, for example a differential amplifier, having one of its inputs at a reference potential.

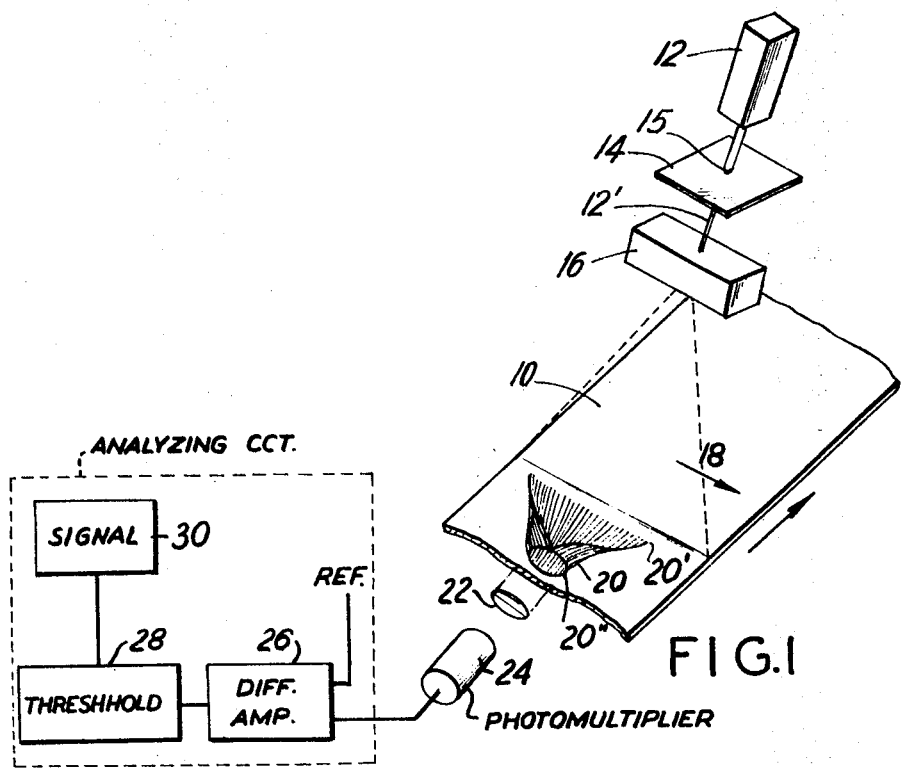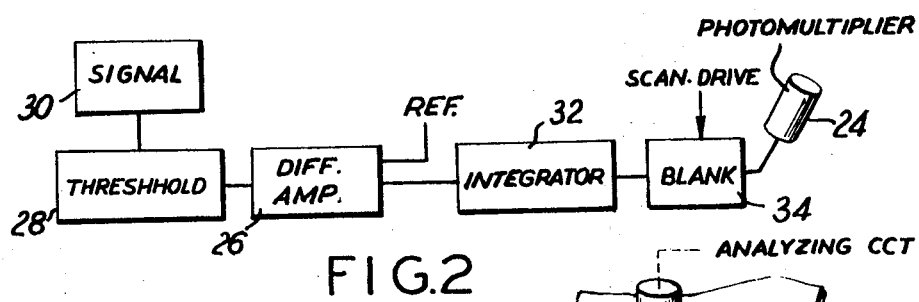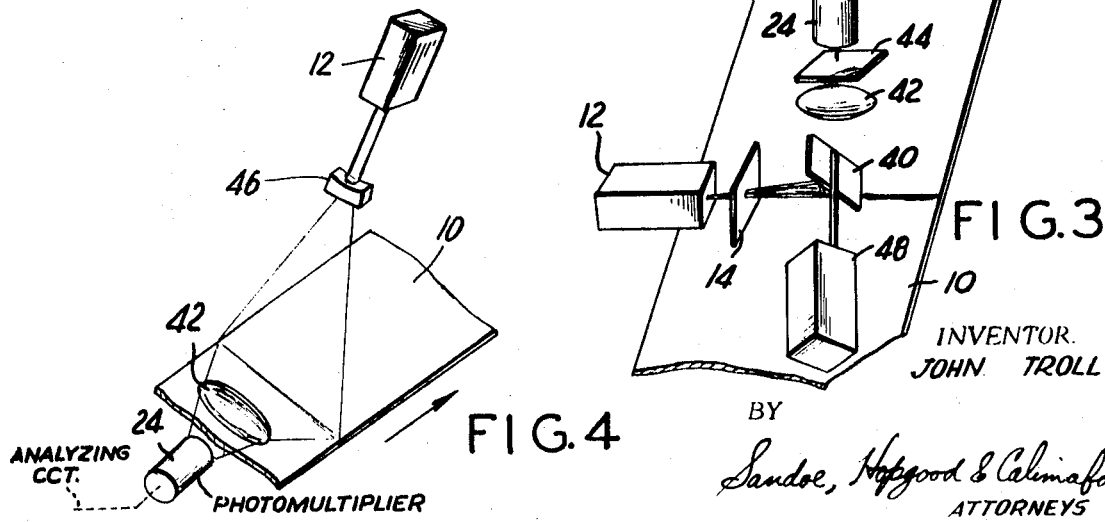

WEB DEFECT DETERMINATION BY LASER BEAM IRRADIATION AND REFLECTED LIGHT EXAMINATION

BACKGROUND OF INVENTION

This invention is directed toward improvements in apparatus for analyzing the surface of moving sheets of material such as paper, metallic plates, textiles, printing materials, etc., which shall be generally referred to herein as webs.

Conventional methods for performing a surface inspection for defects in moving webs are both manual and automatic. The great majority of inspections are still accomplished by eye resulting in an extreme slowdown in the webs' speed and a considerable fatigue to the observer with resultant inaccuracies. Automatic methods call for high illumination and vidicon scanners in various forms all including some type of image compensation to optically halt the web movement while it is being scanned.

Where the defects are characterized by large differences in the reflection characteristics between the nondefective and defective surfaces, and where the width of the web is relatively narrow such methods have found general acceptance. When however the defects are only slightly different in reflection than the nondefective surfaces and where the web comprises large fields of view the signal to noise ratio for nonvidicon and image-detection tubes is insufficient for a clear readout and can be made sufficient only by enormous increases in the illumination level.

Where the apparatus includes a plurality of photocells or several vidicon cameras strung across the width of a web, the complexities which result from attempts to normalize the sensitivity of all the scanning elements renders such arrangements impractical.

OBJECTS OF INVENTION

It is the object of the present invention to overcome the disadvantages of the art and permit the inspection of large web surfaces with a single photosensitive device.

It is a further object of the present invention to provide an arrangement of inspection which obviates the necessity for web image motion compensation.

It is a further object of the present invention to provide an arrangement for web inspection of high sensitivity resolution capable of detecting minute defects.

SUMMARY OF INVENTION

Briefly the invention is predicated upon the concept of causing a laser beam to scan a moving web transversely of the web direction of motion at a predetermined rate, and accumulating the detected light from one linear scan. The accumulated light is analyzed by a photomultiplier feeding a comparator, for example a differential amplifier, having one of its inputs at a reference potential. It is a feature of this invention that comparison may be made against the standard by either an integrative or instantaneous input.

FIG. 1 is a combined perspective and schematic illustration of one embodiment of the invention;

FIG. 2 illustrates an alternative embodiment of a detection arrangement which may be employed with the scanner of FIG. 1;

FIG. 3 is a perspective illustration of another embodiment of the present invention; and FIG. 4 perspectively illustrates still another embodiment of the present invention.

Turning now to the invention and in particular to FIG. 1. The web 10 is advanced in the direction of the arrow 17 by any conventional transport means. For heavy sheets this means may consist of underlying feed rollers and for thin metallic sheets, paper, textiles, etc., there are generally provided playout and takeup rolls, the latter of which is generally driven.

The web is illuminated by laser 12, a source of highly directional monochromatic light. For the function to be described it is desirable that the laser produce a large amount of visible output light, be capable of continuous operation, and operate with a minimum of ancillary equipment such as coolers and high-energy supplies. Exemplary lasers satisfying these requirements are the helium-neon and argon-ion gas lasers. Both of these are commonly available and accordingly shall not be described further.

The monochromatic laser output light beam 12' is passed through mask 14, which includes an aperture 15 for defining the spot size of the beam, to a scanner 16. Scanner 16 functions to traverse the laser beam across the width of moving web 10.

A number of means for scanning or deflecting a coherent light beam have been reduced to practice. These range from relatively simple rotating mirrors to more sophisticated solid state electro-optic deflection schemes. One of the basic criteria of the light beam scanner is its resolution. Using the Rayleigh criterion the number of spot diameters "N" that can be resolved through a deflection angle $\theta$ is given by $$N = (A\theta)/(1.27\lambda)$$

Where $A$ is the aperture of the scanner, $\lambda$ is the wavelength of light and the factor 1.27 accounts for the Gaussian intensity distribution of a laser light beam. It should be emphasized that the resolution $N$ is more important than the scan angle since this angle may be increased or decreased with the use of appropriate optics. A further important characteristic is the scan frequency. A useful figure of merit is the product of scan rate and the number of resolution elements. Scanners having a resolution-frequency product of over 100 million resolution elements per second are currently available.

In the first embodiment to be described, it will be assumed that web 10 is being transported at a very high rate of speed and/or extreme resolution is required. In such a case, a scanning technique that is independent of the physical motion of a refracting or reflecting surface is a necessity. Several electro-optical and accousto-optical scanning techniques are available to fulfill this requisite.

Preferably scanner 16 will consist of an ultrasonic defraction scanner, now available, which depends upon the fact that a stress wave can modify the refractive index of a transparent material such as glass or water. An ultrasonic stress wave propagating through the transparent material effects the light in a manner comparable to a ruled defraction grating. The incident light beam is thus deflected by angle directly proportional to the wavelength of the light and the frequency of the ultrasonic stress wave.

Depending upon the interaction medium and the deflection angle required the ultrasonic stress wave frequency may be maintained between 20 and 200 M.H.Z.

The ultrasonic defraction scanner also provides the ability to modulate the scanning light beam to compensate for any ambiguities in the system and provide the ability to detect extremely delicate nuances.

The beam is thus scanned by ultrasonic scanner 16 in the direction of the arrow 18 transversely of the direction of motion of the web 10. While the laser mask 14 and scanner axis are shown at a particular angle relative to the plane of the web, it will be appreciated by those skilled in the art that this angle is solely for purposes of illustration and may be varied between wide limits (for example 10° to perpendicular or 90°) depending primarily upon the type of material being scanned, scan rate, type of defect, etc.

The light reflected off the moving web is now accumulated for one linear scan for presentation to the analyzing circuit. In this embodiment light accumulation is provided by the fiber optic array 20 which consists of a fiber optic bundle arranged in colinear array at its input end 20' and arranged in a generally cylindrical bundle at its output end 20''. The output of the fiber bundle is focused by lens 22 onto photomultiplier 24 which emits a signal directly proportional to the quanta of reflected light. Differential amplifier 26 compares the photomultiplier output with a reference potential; the variation appearing as an input to threshold detector 28. Upon the variation exceeding a predetermined value the threshold detector triggers signaling device 30 which is provided for example automatically halt the equipment, set off an alarm, etc. Since the photomultiplier, differential amplifier, threshold device and signaling devices are well known to those versed in the art, they shall not be described further.

FIG. 2 shows an alternative arrangement for the analyzing circuit in the embodiment includes an integrator 32 and blanking circuit 34 between the photomultiplier and the differential amplifier. With this arrangement, the result of an entire linear scan, or one web traversal, is accumulated in the integrator and presented at once to differential amplifier 26 where it is compared to reference (which differs from the reference of FIG. 1). While the resolution is much lower than that provided by the arrangement previously described, it does however provide some simplification in the circuitry due to the lower response characteristics required of the included circuitry. Blanking circuit 34 will be synchronized to scanner 16 to provide for retrace blanking. It will be appreciated by those skilled in the art that "retrace blanking" may appear only momentarily (just sufficient to zeroize the integrating circuit) where the web traversal in the opposite direction is actually utilized for defect detection purposes. In other words, both left to right and right to left traversal, or merely unidirectional traversal may be employed for the purpose of analyzing the web.

FIG. 3 illustrates an arrangement which is functionally similar to that of FIG. 1. In this arrangement, the output of laser 12 is again passed through spot size defining mask 14 whereupon it impinges upon a scanner comprising an oscillating mirror 40 driven by means 48. Means 48 may comprise for example a galvanometer scanner a nutating mirror scanner or magnetostrictive torsional scanner all of which are known to those skilled in the art. Any of these arrangements produces a scan of the laser beam transversely of the moving web 10. Positioned to receive the reflected light is photomultiplier 24 and the adjunct analyzing circuit shown in FIG. 1. In this embodiment the light is accumulated for photomultiplier 24 by a cylindrical convex lens 42. Shown disposed between the photomultiplier and the convex lens is filter 44 which may for example be a polarized sheet to sharpen the sensitivity of the photomultiplier to specific defects.

In the embodiment of FIG. 4 the output of laser 12 is spread uniformly across web 10 by concave lens 46. The light is accumulated similarly to that shown in FIG. 3, by virtue of a convex lens 42 which images the collected light upon the face of photomultiplier 24, which in turn feeds the analyzing circuit. In this embodiment as opposed to that previously described, the total scan is continuously analyzed. It therefore is integrative in effect, but without discontinuity. Accordingly the signal to noise ratio is much reduced and the ability of the equipment to pick out minor flaws impeded. Nevertheless the system is significantly less complex and hence less costly.

While the foregoing description sets forth the principles of the invention in connection with specific apparatus, it is to be understood that the description is made only by way of example and not as a limitation of the scope of the invention.

What is claimed is:

1. Apparatus for detecting imperfections in a moving web comprising:
   a laser:
   means for causing the light emitted by said laser to scan across SAID web in a predetermined spot size transversely of the direction of motion thereof;
   photodetector means;
   means for accumulating the reflected light from one linear scan and imaging it on said detector means; and
   analyzing means coupled to said photodetector for comparing the output thereof with a predetermined standard and issuing a signal upon a predetermined deviation therefrom,
   in which said analyzing means includes integrating means for integrating the output from said photodetector means for at least one complete traverse scan, and
   means for comparing the integrated output signal of said integrating means with a predetermined standard.